US009606754B2

(12) United States Patent
Endo et al.

(10) Patent No.: US 9,606,754 B2
(45) Date of Patent: Mar. 28, 2017

(54) PRINT IMAGE GENERATION DEVICE, PRINT SYSTEM, PRINT IMAGE GENERATION METHOD AND PROGRAM

(71) Applicant: Seiko Epson Corporation, Tokyo (JP)

(72) Inventors: Tsunenobu Endo, Matsumoto (JP); Taisuke Okawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/844,206

(22) Filed: Sep. 3, 2015

(65) Prior Publication Data

US 2016/0077772 A1    Mar. 17, 2016

(30) Foreign Application Priority Data

Sep. 11, 2014  (JP) ................................ 2014-185196

(51) Int. Cl.
    *G06F 3/12*      (2006.01)
    *H04N 1/32*      (2006.01)

(52) U.S. Cl.
    CPC .......... *G06F 3/1208* (2013.01); *G06F 3/1219* (2013.01); *G06F 3/1242* (2013.01); *G06F 3/1251* (2013.01); *G06F 3/1256* (2013.01); *H04N 1/32133* (2013.01); *H04N 2201/3205* (2013.01); *H04N 2201/325* (2013.01); *H04N 2201/3226* (2013.01); *H04N 2201/3252* (2013.01); *H04N 2201/3266* (2013.01);
    (Continued)

(58) Field of Classification Search
    CPC .... G06F 3/1208; G06F 3/1219; G06F 3/1242; G06F 3/1251; G06F 3/1256; H04N 2201/3252; H04N 2201/3277; H04N 2201/325; H04N 2201/3266; H04N 2201/3271; H04N 2201/3226; H04N 2201/3205; H04N 1/32133
    USPC ........................................................ 358/1.2
    See application file for complete search history.

(56) References Cited

U.S. PATENT DOCUMENTS 7,508,535 B2 * 3/2009 Hart ................... H04N 1/00281
                                                  345/505
2002/0143762 A1   10/2002 Boyd et al.
(Continued)

FOREIGN PATENT DOCUMENTS

JP       2004-222108 A      8/2004
JP       2005-348221 A     12/2005
(Continued)

OTHER PUBLICATIONS

European Search Report, May 25, 2016, issued in related Patent Application No. EP-15183776.

*Primary Examiner* — Allen H Nguyen
(74) *Attorney, Agent, or Firm* — ALG Intellectual Property, LLC

(57) ABSTRACT

A PC to which a print image generation device according to the invention is applied includes: an acquisition unit which acquires image data of a photographed image and image information recorded with the image data; a conversion unit which converts the acquired image information into text information; an input unit which inputs input information including a title of the photographed image; a print image generation unit which generates a print image for printing the converted text information and the inputted input information, on a print medium for label; and a print instruction unit which gives a print instruction on the print image.

15 Claims, 9 Drawing Sheets

(52) U.S. Cl.
CPC .......... *H04N 2201/3271* (2013.01); *H04N 2201/3277* (2013.01)

(56) References Cited

U.S. PATENT DOCUMENTS

| | | |
|---|---|---|
| 2005/0010562 A1* | 1/2005 | Nagasaka ......... G06F 17/30265 |
| 2006/0209316 A1 | 9/2006 | Toda |
| 2007/0035771 A1 | 2/2007 | Kitamaru |
| 2007/0079256 A1 | 4/2007 | Enomoto |
| 2013/0173531 A1* | 7/2013 | Rinearson ......... G06F 17/30011 |
| | | 707/608 |
| 2014/0122479 A1* | 5/2014 | Panferov ............... G06F 3/0643 |
| | | 707/736 |
| 2015/0145916 A1 | 5/2015 | Ando et al. |

FOREIGN PATENT DOCUMENTS

| | | |
|---|---|---|
| JP | 2006-256141 | 9/2006 |
| JP | 2007-158536 A | 6/2007 |
| JP | 2009-93243 | 4/2009 |
| JP | 4560430 B | 10/2010 |
| WO | WO-2013-179607 | 12/2013 |

* cited by examiner

- ☑ MAKE (NAME OF MANUFACTURER OF IMAGE INPUT DEVICE)
- ☑ MODEL (NAME OF MODEL OF IMAGE INPUT DEVICE)
- ☑ LENS MAKE (NAME OF MANUFACTURER OF LENS)
- ☑ LENS MODEL (NAME OF MODEL OF LENS)
- ☑ FOCAL LENGTH
- ☑ EXPOSURE TIME
- ☑ F NUMBER
- ☑ ISO SPEED
- ☑ EXPOSURE BIAS VALUE
- ☑ EXPOSURE MODE
- ☑ EXPOSURE PROGRAM
- ☑ METERING MODE
- ☑ WHITE BALANCE
- ☑ FLASH
- ☑ USER COMMENT
- ☑ FILE NAME
- ☑ DATE AND TIME OF GENERATION OF ORIGINAL IMAGE DATA
- ☐ COPYRIGHT HOLDER FOR PHOTOGRAPHING / COPYRIGHT HOLDER FOR EDITING

PHOTOGRAPHER
[NAME OF PHOTOGRAPHER] ← 73

FONT
[TYPEFACE 1 ∨] ← 71
[WEIGHT 3 ∨] ← 72

53 { (upper checkboxes)
54 { (font section)

CANCEL ← 74    OK ← 75

PRINT IMAGE GENERATION DEVICE, PRINT SYSTEM, PRINT IMAGE GENERATION METHOD AND PROGRAM

CROSS-REFERENCE TO RELATED APPLICATION

The entire disclosure of Japanese Patent Application No. 2014-185196, filed Sep. 11, 2014 is expressly incorporated by reference herein.

BACKGROUND

1. Technical Field

The present invention relates to a print image generation device, a print system, a print image generation method and a program for printing metadata of a photographed image (digital photograph).

2. Related Art

When a photographed image taken with a digital camera or the like is entered into a contest or displayed at an exhibition as a work, various kinds of information such as the title of the photographed image, the name of the photographer, equipment information and exposure information need to be added to the image of the work and presented to the organizer of the contest or exhibition. Traditionally, many users handwrite such information. However, since the volume of such information is large and there is also a risk of written errors, a technique of printing various kinds of information, using image information (Exif information) recorded with image data of a photographed image at the time of photographing, is proposed recently.

For example, a method is proposed in which image data of a photographed image and image information that is metadata thereof are printed in areas provided next to each other without overlapping with each other (for example, Japanese Patent No. 4,560,430). Also, a method in which image information is printed, superimposed on image data (for example, JP-A-2004-222108), and a method in which an index image is printed on the back side of a print sheet where image data is printed (for example, JP-A-2007-158536) are proposed as well.

However, in the method of Japanese Patent No. 4,560,430, since image information is printed next to image data, there is a problem of wasting sheets. Particularly, since expensive sheets are often used as print sheets for entry or exhibition, it is preferable to reduce the waste as much as possible. Also, many print sheets of this type are relatively thick. Therefore, if such a print sheet is cut and attached to the back side of the work, the work becomes partly thick, making the framing difficult. That is, depending on the type of the frame (rabbet or rebate depth), the attached part may not fall inside the rabbet of the frame and troublesome processing such as thickness adjustment by rabbet depth extension processing may be needed.

The method of JP-A-2004-222108 cannot be applied to works for entry or exhibition because image information is printed, superimposed on image data. In the case of the method of JP-A-2007-158536, since image information is printed on the back side of image data, there is a risk of damage to the work due to scratches formed by the conveyance of the sheet at the time of printing. There is also a problem that, with a sheet with a soft print surface (for example, a sheet coated with plaster or the like), printing cannot be done on the back side (for example, the plaster may be stripped off by the conveyance).

SUMMARY

An advantage of some aspects of the invention is to provide a print image generation device, a print system, a print image generation method and a program by which information to be added to a photographed image which is entered or exhibited as a work can be printed easily and inexpensively, without damaging the work.

A print image generation device according to an aspect of the invention includes: a conversion unit which converts image information recorded with image data of a photographed image at the time of photographing the photographed image, into text information; an input unit which inputs input information including a title of the photographed image; a print image generation unit which generates a print image for printing the text information converted by the conversion unit and the input information inputted by the input unit, on a print medium for label; and a print instruction unit which gives a print instruction on the print image.

A print image generation method according to another aspect of the invention includes executing: converting image information recorded with image data of a photographed image at the time of photographing the photographed image, into text information; inputting input information including a title of the photographed image; and generating a print image for printing the text information which is converted and the input information which is inputted, on a print medium for label.

According to the above configurations, a print image for printing text information converted from image information, and input information including the title of a photographed image, on a print medium for label, is generated. Therefore, information to be added to the work which is entered or exhibited can be printed easily and inexpensively. That is, the information that should be added to the work can be printed on an inexpensive label sheet without having to handwrite the information. Also, since the print image is printed on a separate print medium from the work, there is no risk of damaging the work. Moreover, since the "title of the photographed image", essential for the work which is entered or exhibited, can be inputted as input information, a satisfactory label to be attached to the work can be printed even if the image information does not include any "image description (tag name prescribed by Exif)". Also, since the print medium for label is thinner than the print sheet used for printing the work which is entered or exhibited, there is an advantage that any type of frame can be used at the time of framing the work with the label attached to the back side of the work.

In the print image generation device described above, the print image generation unit may generate a print image for printing, on the print medium, a reduced image formed by reducing the image data of the photographed image, with the text information and the input information.

According to this configuration, since a reduced image of the photographed image is printed on the label, the label can be easily associated with the photographed image (work). This enables efficient work such as preparing a plurality of labels for a plurality of works simultaneously and subsequently attaching the labels to the works.

In the print image generation device described above, the print image generation unit may generate a print image in which the input information has a larger font size than the text information and in which a print area for the reduced image, a print area for the input information, and a print area for the text information are arranged laterally in this order.

According to this configuration, since the input information is printed with a larger font size than the text information converted from the image information, the input information such as the "title of the photographed image", essential for the work which is entered or exhibited, can be made more visible. Also, since the print areas are arranged laterally in order of the reduced image, the input information, and the text information, it is possible to perform processing such as cutting the print area for the reduced image arranged on one end of the label when the label size is large for the work or when the reduced image used for associating with the photographed image is no longer necessary.

In the print image generation device described above, the print medium for label may be a tape-like medium, the device may further include a preview display unit which shows a preview of the print image, and the preview display unit may display an expected print appearance of the print image printed on the tape-like medium, and a scale indicating a length of the expected print appearance in a direction of tape length.

According to this configuration, since a tape-like medium is used as the print medium, the tape length can be changed suitably according to the number of letters of the input information and the text information. That is, even if the number of letters used is large, there is no need to reduce the font size or narrow the linefeed width, and therefore the appearance of the label will not be impaired. Also, since the preview display unit shows a scale indicating the length of an expected print appearance in the direction of tape length, the user can grasp the label length before printing. Thus, there is no inconvenience such that the prepared label is too long to be attached to the work, and consequently the print medium will not be wasted.

In the print image generation device described above, the input unit may input a photographer and a name of a lens in addition to the title of the photographed image, as the input information.

According to this configuration, since the "photographer", essential for the work which is entered or exhibited, can be inputted as input information, a satisfactory label to be attached to the work can be prepared even if the image information does not include any "artist (tag name prescribed by Exif)", "copyright (copyright holder for photographing) (tag name prescribed by Exif)", or "copyright (copyright holder for editing) (tag name prescribed by Exif)". Meanwhile, the "name of the lens" may not be included in the image information ("Lens Model (name of the model of the lens) (tag name prescribed by Exif)"), depending on the manufacturer. Even if an image input device made by such a manufacturer is used, the name of the lens can be securely printed on the label.

In the print image generation device described above, the image information may include one of an artist, a copyright holder for photographing, and a copyright holder for editing, and the input unit may be able to select one of the artist, the copyright holder for photographing, and the copyright holder for editing included in the image information, instead of inputting the photographer, if the image information includes one of the artist, the copyright holder for photographing, and the copyright holder for editing.

According to this configuration, if the information included in the image information can be applied to the "photographer", the user can omit the input of the "photographer".

If the image information includes two or more of the "artist (tag name prescribed by Exif)", the "copyright (copyright holder for photographing) (tag name prescribed by Exif)", and the "copyright (copyright holder for editing) (tag name prescribed by Exif)", it is preferable that one item can be selected from these.

In the print image generation device described above, the image information may include a plurality of items including an item related to equipment and an item related to exposure, the device may further include an item selection unit which selects one item from the plurality of items, and the conversion unit may convert the item selected by the item selection unit, into the text information.

According to this configuration, information needed by the user can be selected and printed on the label, from the plurality of items included in the image information.

The "item related to equipment" may include the "Make" (name of the image input device manufacturer) (tag name prescribed by Exif)," "Model" (name of the model of the image input device) (tag name prescribed by Exif))", "lens specification (tag name prescribed by Exif)", "Lens Make (tag name prescribed by Exif)", "Lens model (tag name prescribed by Exif)", "lens serial number (tag name prescribed by Exif)" and the like.

Meanwhile, the "item related to exposure" may include the "F-number", "exposure time", "exposure program", "photographic sensitivity", "exposure Bias value", "metering Mode" and the like (each being a tag name prescribed by Exif).

In the print image generation device described above, the image information may include a name of a model of an image input device with which the photographed image is photographed, and the print image generation unit may generate the print image omitting a name of a manufacturer if the name of the manufacturer is included in the name of the model of the image input device included in the text information.

According to this configuration, if the image information includes the "name of the manufacturer of the image input device ("Make" tag name prescribed by Exif)" and "name of the model of the image input device ("Model" tag name prescribed by Exif)" and the text information indicating the "name of the model of the image input device ("Model" tag name prescribed by Exif)" includes a letter string indicating the name of the manufacturer, duplicate printing of the name of the manufacturer can be prevented.

In the print image generation device described above, the image information may include a name of a model of a lens, and the print image generation unit may generate the print image omitting a name of a manufacturer if the name of the manufacturer is included in the name of the model of the lens included in the text information.

According to this configuration, if the image information includes the "Lens Make (tag name prescribed by Exif)" and "Lens Model (tag name prescribed by Exif)", and the text information indicating the "Lens Model (tag name prescribed by Exif)" includes a letter string indicating the name of the manufacturer, duplicate printing of the name of the manufacturer can be prevented.

In the print image generation device described above, the image information may include an F-number or lens focal length, and the conversion unit may convert the F-number or lens focal length in a fractional notation into a decimal notation at the time of conversion to the text information.

According to this configuration, the "F-number" or "lens focal length" in a fractional notation prescribed by Exif can be shown in a decimal notation, which is easy to understand.

In the print image generation device described above, the image information may include a duration of exposure, and the conversion unit may convert the duration of exposure into a decimal notation if the duration of exposure is 1 second or longer, and into a proper fractional notation reduced to the lowest terms if the duration of exposure is shorter than 1 second, at the time of conversion to the text information.

According to this configuration, the "exposure time" prescribed by Exif can be shown in a way that is easy to understand, according to whether the duration of exposure is 1 second or longer, or not.

In the print image generation device described above, the image information may include an exposure correction value, and the conversion unit may convert the exposure correction value into a mixed number notation if an absolute value of the exposure correction value is 1 or greater, and into a proper fractional notation reduced to the lowest terms if the absolute value of the exposure correction value is less than 1, at the time of conversion to the text information.

According to this configuration, the "exposure Bias value" prescribed by Exif can be shown in a way that is easy to understand, according to whether the absolute value of the exposure correction value is 1 second or greater, or not.

A print system according to still another aspect of the invention includes a print image generation device and a printer. The print image generation device includes: a conversion unit which converts image information recorded with image data of a photographed image at the time of photographing the photographed image, into text information; an input unit which inputs input information including a title of the photographed image; a print image generation unit which generates a print image for printing the text information converted by the conversion unit and the input information inputted by the input unit, on a print medium for label; and a print instruction unit which gives the printer a print instruction on the print image. The printer includes a print unit which prints the print image on the print medium according to the print instruction by the print instruction unit.

According to this configuration, text information converted from image information, and input information including the title of a photographed image are printed on a print medium for label. Therefore, a label to be attached to the work which is entered or exhibited can be printed easily and inexpensively. Also, since the "title of the photographed image", essential for the work which is entered or exhibited, can be inputted as input information, a satisfactory label to be attached to the work can be prepared even if the image information does not include any "image Description (tag name prescribed by Exif)".

A program according to yet another aspect of the invention causes a computer to execute each process in the print image generation method.

By using this program, a print image generation method in which information to be added to a photographed image which is entered or exhibited as a work can be printed easily and inexpensively without damaging the work, can be realized.

BRIEF DESCRIPTION OF THE DRAWINGS

Embodiments of the invention will now be described by way of example only with reference to the accompanying drawings, wherein like numbers reference like elements.

FIG. 3 is a plan view showing an example of an attachment label for work.

FIG. 5 shows an example of display on a second editing screen.

FIG. 7 shows an example of display on the first editing screen according to Modification 1.

FIG. 9 is a plan view showing an example of an attachment label for work according to Modification 3.

DESCRIPTION OF EXEMPLARY EMBODIMENTS

Figure 1:
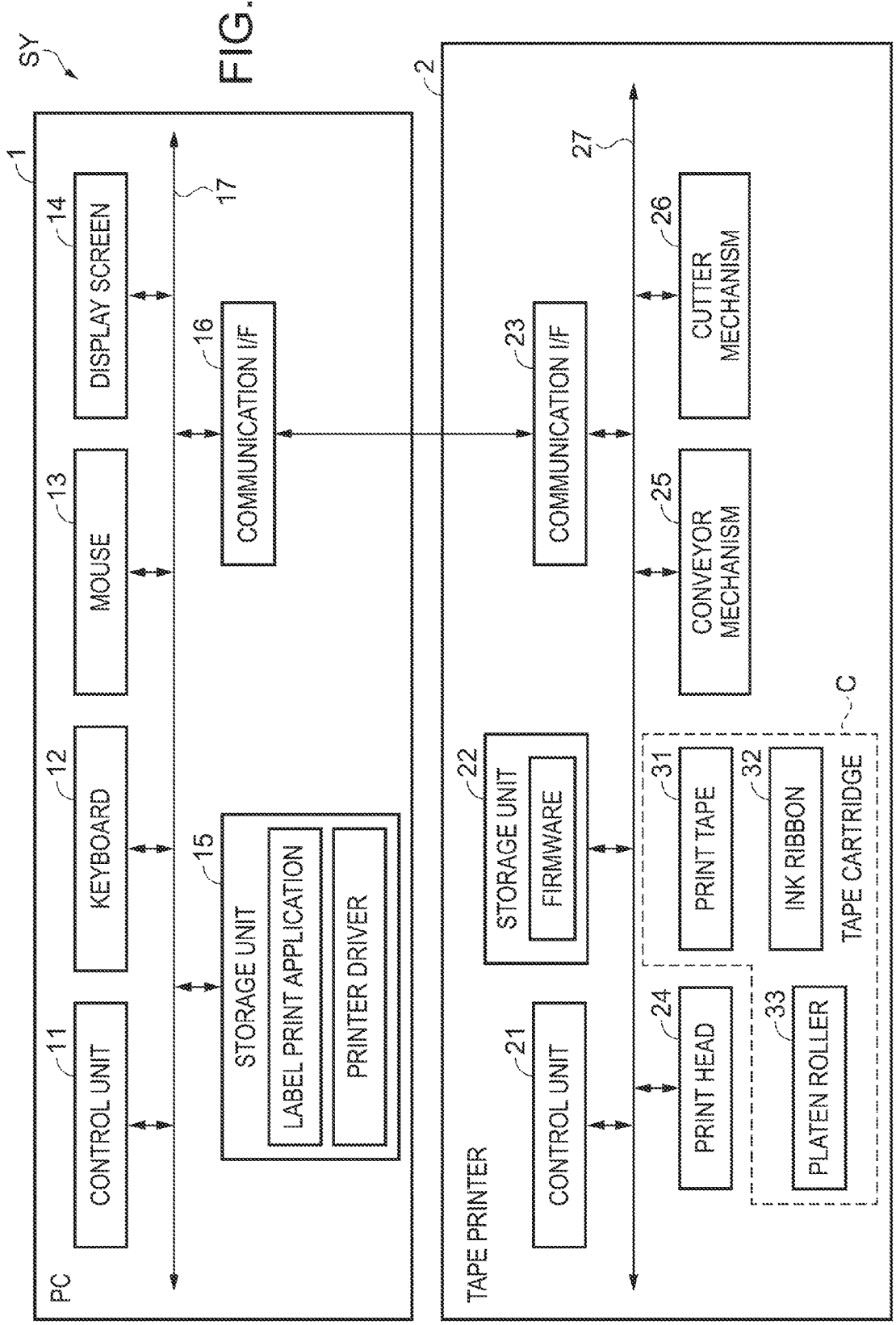
FIG. 1 is a block diagram showing the system configuration of a print system according to an embodiment of the invention.

Hereinafter, a print image generation device, a print system, a print image generation method and a program according to an embodiment of the invention will be described in detail, referring to the drawings. In this embodiment, a case where the print image generation device is applied to a PC (personal computer) will be described as an example.

FIG. 1 is a block diagram showing the system configuration of a print system SY according to an embodiment of the invention. The print system SY includes a PC 1 which generates a print image, and a tape printer 2 which prints the print image generated by the PC 1.

The PC 1 has a control unit 11, a keyboard 12, a mouse 13, a display screen 14, a storage unit 15, and a communication interface (hereinafter, referred to as "communication I/F") 16. These parts are connected to each other via a bus 17.

The control unit 11 includes a CPU (central processing unit), a ROM (read only memory), and a RAM (random access memory) or the like, and controls the entirety of the PC 1. The keyboard 12 and the mouse 13 are used by the user to input information and also to carry out various operations. The display screen 14 displays an editing screen D (D1, D2, see FIGS. 4 to 6), described later, and also displays various kinds of information.

The storage unit 15 is a non-volatile storage device such as an HDD (hard disk drive) and stores various control programs and various control data. The PC 1 in the embodiment stores a label print application ("program" in the appended claims) and a printer driver as a control program. The label print application is application software for printing an attachment label for work L (see FIG. 3 or the like). This attachment label for work L is to be attached to the back side of a work in order to enter or exhibit a photographed image (digital photograph taken with a digital camera or the like) as a work in a contest or exhibition, or to rearrange and manage the work. The printer driver is a device driver for controlling the tape printer 2.

The communication I/F 16 is an interface for communicating with the tape printer 2. The communication method thereof may be wired or wireless. Also, the form of connection thereof may be connection via a network or one-to-one connection via a cable or the like.

Meanwhile, the tape printer 2 has a control unit 21, a storage unit 22, a communication I/F 23, a print head 24, a conveyor mechanism 25, and a cutter mechanism 26. These parts are connected to each other via a bus 27.

The control unit 21 includes a CPU, a RAM, and a buffer or the like, and controls the entirety of the tape printer 2. The storage unit 22 stores various control programs and control data, including firmware. The communication I/F 23 communicates with the PC 1.

The print head 24 prints on a print tape 31 which is a tape-like (elongated) print medium. The tape printer 2 in the embodiment is supplied with the print tape 31, an ink ribbon 32 and a platen roller 33, as a tape cartridge C. The print tape 31 includes a recording tape with an adhesive layer formed on the back side thereof, and a release tape bonded to the recording tape with the adhesive layer, and is accommodated in the tape cartridge C as a rolled tape reel. The ink ribbon 32 is formed with the same width as the print tape 31 and is accommodated in the tape cartridge C as a rolled ribbon reel. Although not particularly illustrated, a detection unit for detecting the type of cartridge is provided in a cartridge loading section where the tape cartridge C is loaded. With the detection unit, it is possible to detect the tape width, tape color, material and the like of the print tape 31.

The conveyor mechanism 25 conveys the print tape 31 reeled off from the tape reel, toward a print position (position where the print head 24 and the platen roller 33 face each other) and a tape discharge port. The cutter mechanism 26 is situated near the tape discharge port and cuts the printed print tape 31 in the direction of tape width.

In the tape printer 2 with the above configuration, when the tape cartridge C is loaded in the cartridge loading section, the print head 24 abuts against the platen roller 33 with the print tape 31 and the ink ribbon 32 held in-between, thus enabling printing. Subsequently, according to a print instruction from the PC 1, the print tape 31 is reeled off from the tape cartridge C by the conveyor mechanism 25, and heat generation elements in the print head 24 are selectively heated, thus printing on the recording tape of the print tape 31. During the execution of printing, the printed part of the print tape 31 is conveyed outside of the casing from the tape discharge port by the conveyor mechanism 25, as required. As the printing is completed, the rear margin is conveyed to a position where a tape length is secured. Then, the conveyance is temporarily stopped and the print tape 31 is cut by the cutter mechanism 26. In the description below, the print tape 31 which is already printed and cut is called a label (attachment label for work L).

Figure 2:
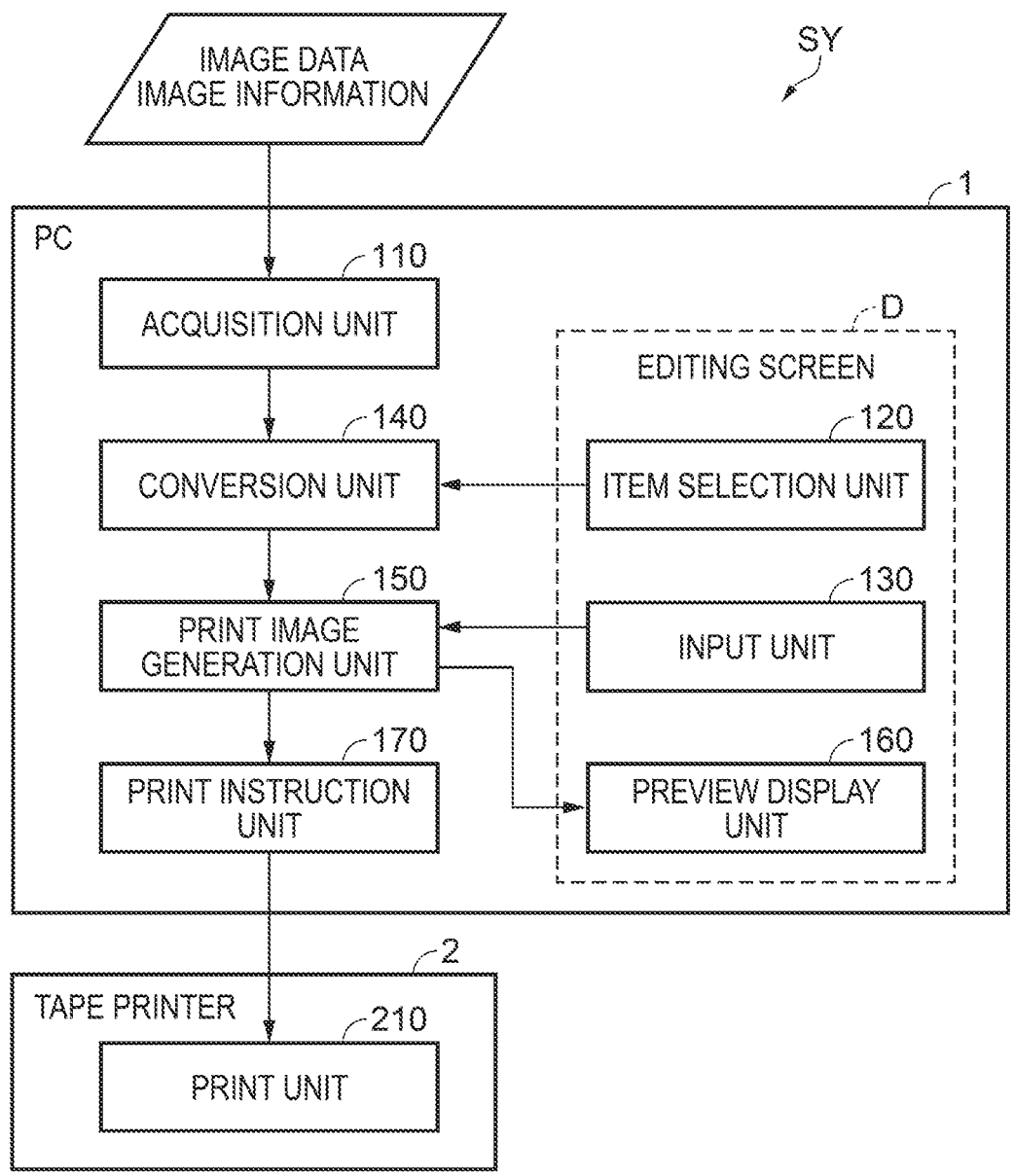
FIG. 2 is a block diagram showing the functional configuration of the print system.

Next, referring to FIG. 2, the functional configuration of the print system SY will be described. The PC 1 has, as the functional configuration thereof, an acquisition unit 110, an item selection unit 120, an input unit 130, a conversion unit 140, a print image generation unit 150, a preview display unit 160, and a print instruction unit 170. Of these, the print instruction unit 170 is the function of the printer driver, whereas the others are the functions of the label print application. Of the functions of the label print application, the item selection unit 120, the input unit 130 and the preview display unit 160 are functions realized mainly via an editing screen D.

The acquisition unit 110 acquires image data of a photographed image recorded at the time of photographing the photographed image with an image input device, and image information which is meta data of the image data. Here, the "image input device" refers to a digital still camera, digital video camera, mobile phone with camera, tablet terminal with camera (for example, smartphone), or the like. The "photographed image" refers to a "main image0th IFD)" prescribed by the image file format standard for digital still camera (Exif), jointly decided by Camera and Imaging Products Association (CIPA) and Japan Electronics and Information Technology Industries Association (JEITA).

The "image information" refers to a set of "tags" and "thumbnail data", similarly prescribed by Exif. In the embodiment, the "image information" includes a plurality of items (a plurality of tags) including items related to equipment and items related to exposure. Here, the "items related to equipment" include the "name of the manufacturer of the image input device ("Make" (tag name prescribed by Exif))", "name of the model of the image input device ("Model" (tag name prescribed by Exif))", "Lens specification", "lens Make", "lens Model", "lens serial number" and the like (all being tag names prescribed by Exif). The "items related to exposure" include the "F-number", "exposure time", "exposure program", "photographic sensitivity", "exposure Bias value", "metering Mode" and the like (all being tag names prescribed by Exif). In addition, various other tags prescribed by Exif than the above items may be included in the "image information".

The image data and the image information acquired by the acquisition unit 110 may be acquired from the image input device via wired or wireless communication, or may be acquired from a storage device (for example, a web server on the internet) other than the image input device via wired or wireless communication. The image data and the image information may also be acquired via various memories.

The item selection unit 120 selects an item from the plurality of items included in the "image information". In the embodiment, an item (tag name) which is a print object to be printed on the attachment label for work L is selected on a second editing screen D2 (see FIG. 5).

The input unit 130 inputs input information including the title of the work (title of the photographed image), the photographer, the name of the lens and the font type. In the embodiment, the name of the lens and the title of the work are inputted on a first editing screen D1 (see FIG. 4) and the font type and the photographer are inputted on the second editing screen D2 (see FIG. 5). Here, to "input" is a concept including not only inputting letters with the use of the keyboard 12 but also selecting and inputting a candidate from a plurality of selection candidates.

The conversion unit 140 converts the item selected by the item selection unit 120, of the image information acquired by the acquisition unit 110, into text information on the basis of Exif standard. In this case, the conversion unit 140 converts the "Fnumber (tag name prescribed by Exif)" and the "focal length (tag name prescribed by Exif)" in a fractional notation according to the Exif standard, into a decimal notation. The conversion unit 140 converts the "Exposure Time (tag name prescribed by Exif)" into a decimal notation if the duration of exposure is 1 second or longer, and into a proper fractional notation reduced to the lowest terms if the duration of exposure is shorter than 1. Moreover, the conversion unit 140 converts the "exposure Bias value (tag name prescribed by Exif)" into a mixed number notation if the absolute value of the exposure correction value is 1 or greater, and into a proper fractional notation reduced to the lowest terms if the absolute value of the exposure correction value is less than 1. With these configurations, these items, which are hard to understand according to the Exif standard, can be made easier for the user to understand. As the conversion algorithm thereof, a known algorithm such as the Euclidean algorithm can be used.

The print image generation unit 150 generates a print image for printing the text information converted by the conversion unit 140 and the input information inputted by the input unit 130, onto the print tape 31 (print medium for label). The print image generation unit 150 also reduces the image data of the photographed image according to the tape width of the print tape 31, thus generates a reduced image, and generates the print image including the reduced image.

If the "name of the model of the image input device" in the text information converted by the conversion unit 140 includes a letter string indicating the name of a manufacturer, the print image generation unit 150 generates the print image, omitting the letter string indicating the name of the manufacturer. Similarly, if the "Lens Model (name of the model of the lens)" in the text information converted by the conversion unit 140 includes a letter string indicating the name of a manufacturer, the print image generation unit 150 generates the print image omitting the letter string indicating the name of the manufacturer. With these configurations, duplicate printing of the name of the manufacturer can be prevented when the "Make (name of the manufacturer of the image input device) or Lens Make (tag name prescribed by Exif)" and the "Make (name of the model of the image input device) or Lens Model (tag name prescribed by Exif)" are printed together on the attachment label for work L.

It is also possible to carry out such omission of the name of the manufacturer, only if both of the "Make (name of the manufacturer of the image input device) (tag name prescribed by Exif)" and the "Model (name of the model of the image input device) (tag name prescribed by Exif)" are selected by the item selection unit 120, or only if both of the "Lens Make (name of the manufacturer of the lens) (tag name prescribed by Exif)" and the "Lens Model (name of the model of the lens) (tag name prescribed by Exif)" are selected.

Moreover, if the "exposure mode" in the text information converted by the conversion unit 140 is manual exposure and the "exposure program" is manual, the print image generation unit 150 generates the print image omitting the letter string of the "exposure program". With this configuration, duplicate printing of the item of manual photographing can be prevented, when the "exposure mode" and the "exposure program" are printed together on the attachment label for work L and manual photographing is employed.

Figure 4:
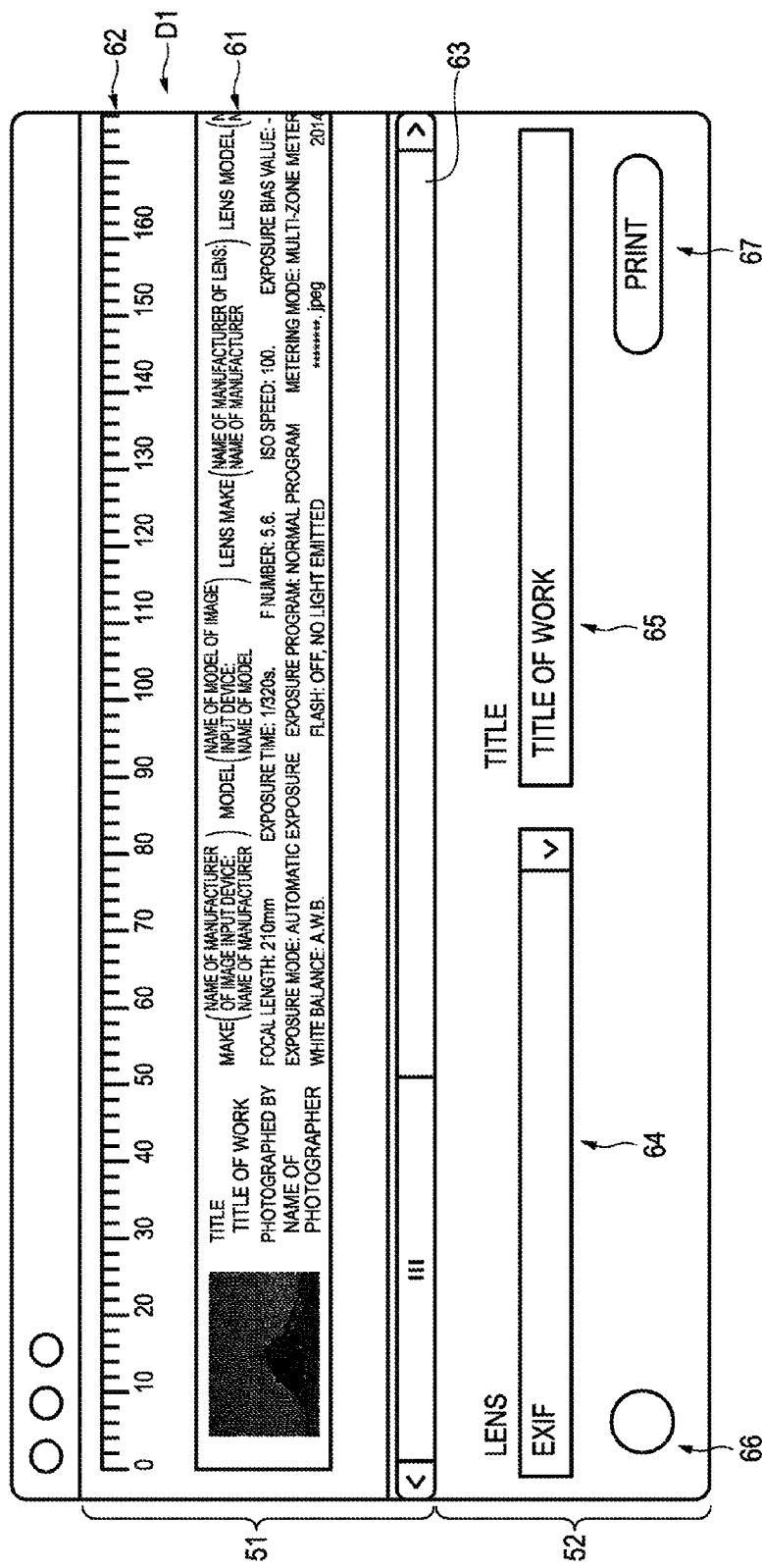
FIG. 4 shows an example of display on a first editing screen.

The preview display unit 160 displays a preview of the print image generated by the print image generation unit 150, along with an expected tape appearance of the print tape 31 as the print medium for the print image (an expected print appearance of the attachment label for work L is displayed; see FIG. 4). The preview display unit 160 also displays a scale indicating the length of the expected tape appearance in the direction of tape length. With this configuration, the user can grasp the label length of the attachment label for work L before printing, and can solve inconvenience such that the prepared attachment label for work L is too long to be attached to the work.

The print instruction unit 170 gives the tape printer 2 a print instruction on the print image generated by the print image generation unit 150. Specifically, the print instruction unit 170 generates a print command (including a cutting command) that can be interpreted by the tape printer 2, and transmits the print command to the tape printer 2.

The print instruction unit 170 may transmit a print command described in a markup language such as XML (Extensible Markup Language), instead of generating a print command, (where it is assumed that the tape printer 2 can interpret the markup language). In this case, a driverless configuration can be employed.

Meanwhile, the tape printer 2 has a print unit 210 as the functional configuration thereof. The print unit 210 prints the print image on the print tape 31 according to the print instruction from the print instruction unit 170 and cuts the print tape 31, thus preparing the attachment label for work L.

Figure 3:
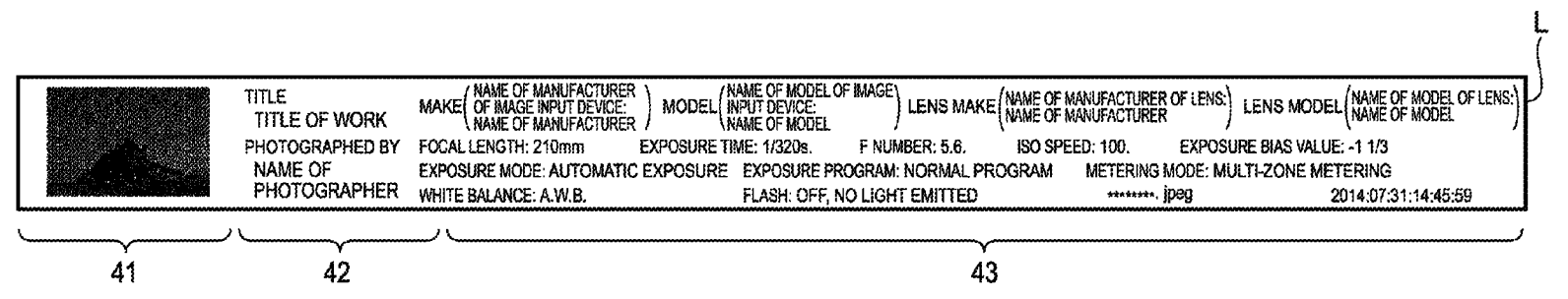

Next, referring to FIG. 3, the print format and print items on the attachment label for work L will be described. The print image generation unit 150 arranges and shows the reduced image formed by reducing the image data, the input information inputted by the input unit 130 and the text information converted by the conversion unit 140, according to a predetermined print format. Specifically, from the forward end of the print tape 31 (from the left-hand side in the illustration), a print area 41 for the reduced image, a print area 42 for the input information, and a print area 43 for the text information are arranged laterally in this order. The input information is shown in a larger font size than the text information. Of the input information, the title of the work is shown in a larger font size than the name of photographer or in the same font size, as shown in the figure. As for the text information, all the items are shown in the same font size.

In the print area 42 for the input information and the print area 43 for the text information, the letters are arranged in such a way that the direction of tape length (longitudinal direction) of the print tape 31 corresponds to the direction of lines. In the print area 42 for the input information, the title of the work and the name of the photographer are arranged in one line each. Therefore, if the title of the work or the name of the photographer has a large number of letters, the print area 42 for the input information expands accordingly in the direction of tape length. Also, with each item, the tag content is shown in a larger font size than the tag name.

In the print area 43 for the text information, a tag name and a tag content corresponding to each item of the plurality of items selected on the second editing screen D2 are shown with a "colon (:)" inserted in-between. However, with some predetermined items such as the "file name (******.jpeg)" and "date and time of generation of original image data (2014:07:31:14:45:59)", the description of the tag name is omitted. Also, while the print area 43** in the illustrated example is formed having four lines, the number of lines may be changed according to the number of items selected. The font size may be increased with the change in the number of lines. Also, based on the longest line of the plurality of lines, the space (blank space) between items in the other lines may be expanded, thus laying out the text in full justification in the direction of tape length.

In the embodiment, the tape width of the print tape 31 is a fixed width. Therefore, if the tape width of the tape cartridge C loaded in the tape printer 2 does not coincide with the fixed width at the point when a print instruction is given from the label print application, the label print application displays an error message prompting the replacement of the tape cartridge C, on the display screen 14. It is possible to display the error message only if the tape width is narrower than the fixed width, and not to display the error message if the tape width is broader than the fixed width. In this case, the print image may be printed in an enlarged manner corresponding to the tape width, or may be printed in a centering layout in the direction of tape width, with an image size similar to that in the case of printing the fixed-width print tape 31.

Figure 6:
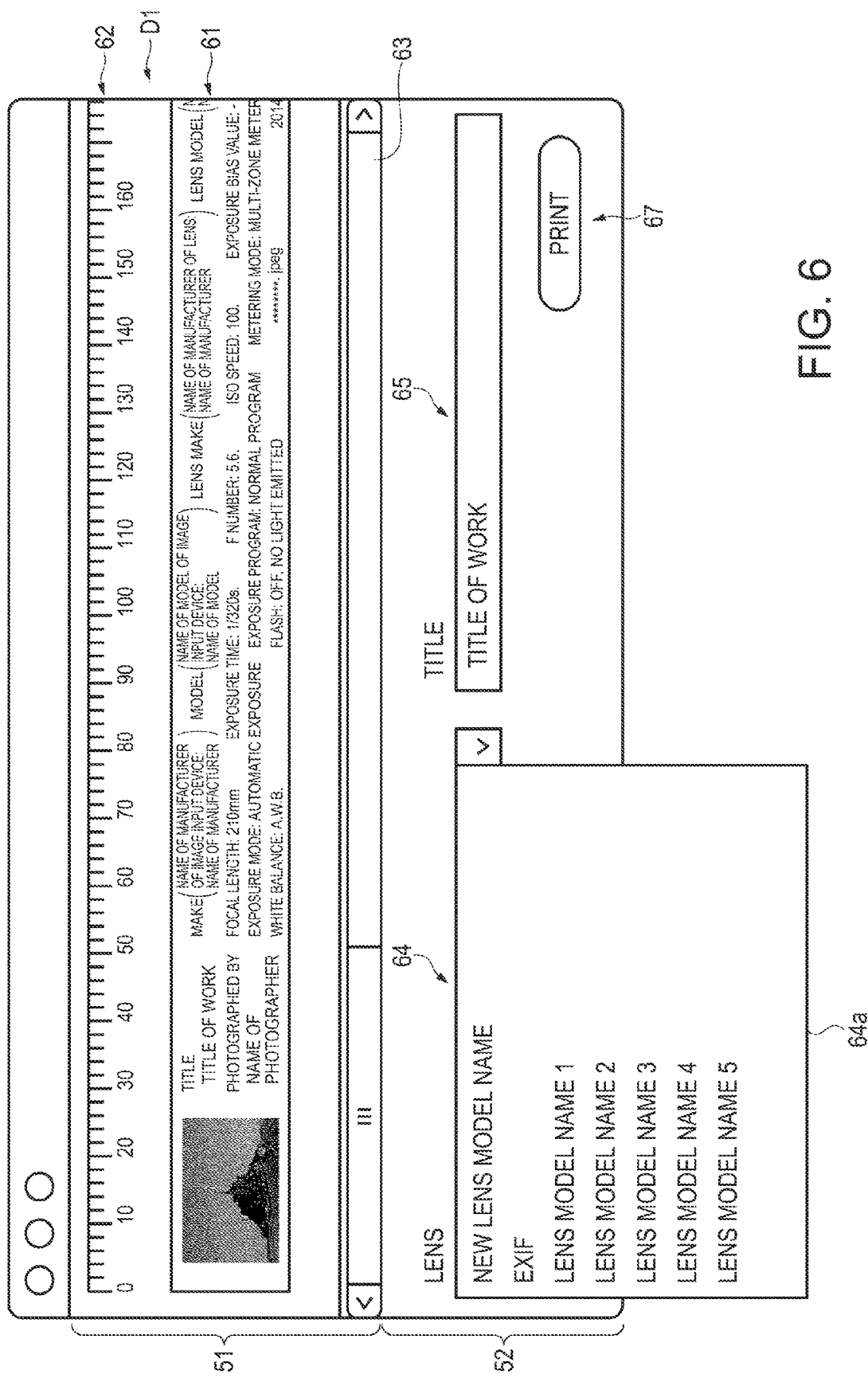
FIG. 6 shows an example of display in the state where a pull-down menu of lens input section is opened on the first editing screen.

Next, referring to FIGS. 4 to 6, the display format and display items on the editing screen D will be described. The editing screen D has a first editing screen D1 and a second editing screen D2. Of these, the first editing screen D1 is a main screen opened by the startup of the label print application. The second editing screen D2 is a sub screen called (opened) from the first editing screen D1.

As shown in FIG. 4, the first editing screen D1 includes a preview display area 51 and an input area 52. In the preview display area 51, an expected print appearance 61 of the attachment label for work L (expected print appearance of the print image printed on the print tape 31), a scale 62 indicating the tape length of the attachment label for work L that is actually prepared, and a scroll bar 63 for allowing the display of the expected print appearance 61 to be scrolled, are displayed. In the illustrated example, the scale 62 that is on a millimeter basis is shown. However, the unit employed may be switchable to another unit such as inch.

In the input area 52, a lens input section 64, a title input section 65, a help button 66 and a print execution button 67 are displayed. In the lens input section 64, as the pull-down button is pressed, a pull-down menu 64a as shown in FIG. 6 is displayed. If the "new lens model name" is selected from this pull-down menu 64a, text input with the keyboard 12 is enabled and a letter string that is inputted is reflected on the "name of the model of the lens" in the expected print appearance 61. If "Exif" is selected, the "name of the model of the lens (tag name prescribed by Exif)" included in the image information is reflected on the "name of the model of the lens" in the expected print appearance 61. It is also possible to select one of the candidates from the plurality of lens model names stored in advance in the label print application (in FIG. 6, "lens model name 1", "lens model name 2" and the like") and reflect the selected lens model name on the "name of the model of the lens" in the expected print appearance 61. If the "new lens model name" is elected and text input is made, the result of the input may be stored and displayed as a lens model name candidate the next time the first editing screen D1 is opened, and onward.

In the title input section 65, text input with the keyboard 12 is available and a letter string that is inputted is reflected on the "title" in the expected print appearance 61. There may be a limitation on the number of letters that can be inputted in the title input section 65. If the help button 66 is pressed, a help screen is displayed (not shown). If the print execution button 67 is pressed, the label print application outputs a print image similar to the expected print appearance 61 displayed in the preview display area 51 at that point, to the printer driver.

Meanwhile, the second editing screen D2 includes an item selection area 53 and an input area 54, as shown in FIG. 5. In the item selection area 53, whether to print or not can be selected with respect to the plurality of items included in the image information. In the illustrated example, it means that the items with the check marks are objects to be printed. That is, if check marks are put on items other than the "copyright holder for photographing/copyright holder for editing", as shown in FIG. 5, the attachment label for work L on which the items other than the "copyright holder for photographing/copyright holder for editing", of the items displayed in the item selection area 53, are printed, is prepared (see FIG. 3). The result of the selection in the item selection area 53 is stored, and if there is no particular change (if the second editing screen D2 is not opened), the result of the previous selection is used. The item names displayed in the item selection area 53 may be made changeable on another configuration setting screen or the like. Also, the item selection area 53 may be configured in such a way as to enable designation of the print order or print line of each item in the print area 43 for the text information.

In the input area 54, a typeface input section 71, a typeface style input section 72, a photographer input section 73, a cancel button 74 and an OK button 75 are displayed. In the typeface input section 71, as in the lens input section 64, a pull-down menu is displayed (not shown) when the pull-down button is pressed. In the typeface input section 71, a typeface (font) is selected. In the typeface style input section 72, too, a pull-down menu is displayed (not shown) when the pull-down button is pressed. In the typeface style input section 72, typeface styles such as weight, tilt, and letter width are selected. The results of input in the typeface input section 71 and the typeface style input section 72 are reflected on all the fonts printed in the print area 42 for the input information and the print area 43 for the text information.

In the photographer input section 73, too, a pull-down menu is may be displayed (not shown) when a pull-down button is pressed. As in the lens input section 64, if the "new photographer" is selected, text input with the keyboard 12 is enabled. If "Exif" is selected, the "artist (tag name prescribed by Exif)" or the "copyright (copyright holder for photographing/copyright holder) for editing (tag name prescribed by Exif)" included in the image information is reflected on the "photographer". If the image information includes both the "artist (tag name prescribed by Exif)" and the "copyright (copyright holder for photographing/copyright holder) for editing (tag name prescribed by Exif)" and these are different names, a selection screen for selecting which to reflect is displayed, or the candidates of "Exif (artist)" and "Exif (copyright holder for photographing/copyright holder for editing)" are provided in the pull-down menu.

If the cancel button 74 is pressed, all the edited contents in the second editing screen D2 are nullified. If the OK button 75 is pressed, the second editing screen D2 is closed and the edited contents in the second editing screen D2 are reflected on the print image and the expected print appearance 61.

As described above, according to the embodiment, the text information formed by converting the image information (Exif information), and the input information such as the title of the work are printed on the print tape 31. Therefore, the attachment label for work L to be attached to the work for entry or exhibition can be prepared easily and inexpensively. That is, since the information to be added to the work is printed on a separate print medium from the work, expensive print sheets for the work will not be wasted and there is no risk of damaging the work. Also, since the print tape 31 is relatively thin (significantly thinner than print sheets for entry or exhibition, many of which are quite thick), there is an advantage that any type of frame can be used at the time of framing the work with the print tape attached to the back side of the work.

Since the "title of the photographed image" and the "name of the photographer", essential for the work which is entered or exhibited, can be inputted as the input information, a satisfactory label to be attached to the work can be prepared even if the image information does not include any "image Description (tag name prescribed by Exif)", "artist (tag name prescribed by Exif)", "copyright (copyright holder for photographing/copyright holder) for editing (tag name prescribed by Exif)", or the like. Moreover, since the name of the lens can be inputted as the input information, the name of the lens can be securely shown on the attachment label for work L even if an image input device made by a manufacturer who does not include the name of the lens in the "lens Model (tag name prescribed by Exif)" is used.

Also, since the scale 62 indicating the length of the expected print appearance in the direction of tape length is displayed in the preview display area 51 in the first editing screen D1, the user can grasp the label length before printing. Therefore, there is no inconvenience such that the prepared label is too long to be attached to the work, and consequently the print medium will be not wasted.

Since a reduced image of the photographed image is printed on the attachment label for work L, the correspondence between the photographed image (work) and the attachment label for work L can be easily taken. This enables efficient work such as simultaneously preparing a plurality of attachment labels for work L, for a plurality of works, and then attaching the labels to the works. Also, since the reduced image is generated from the photographed image itself, instead of the "thumbnail data" included in the image information, the correspondence between the work and the attachment label for work L can be securely achieved even if the image data of the photographed image is edited.

Moreover, since the respective print areas 41, 42, 43 are laterally arranged on the attachment label for work L in order of the reduced image, the input information, and the text information, it is possible to perform processing such as cutting the print area 41 for the reduced image if the label size is large for the work or if the reduced image is no longer needed as the correspondence with the work is completed, or leaving the print area 42 for the input information only (that is, cutting the print areas 41, 43 for the reduced image and for the text information). Also, since the print tape 31 is used as the print medium, the tape length can be varied properly according to the number of letters of the input information and the text information.

Also, the following modifications can be employed, without being limited to the embodiment. In the modifications below, the same parts of the configurations as the embodiment are denoted by similar reference numbers and symbols, omitting detailed description.

Modification 1

Figure 7:
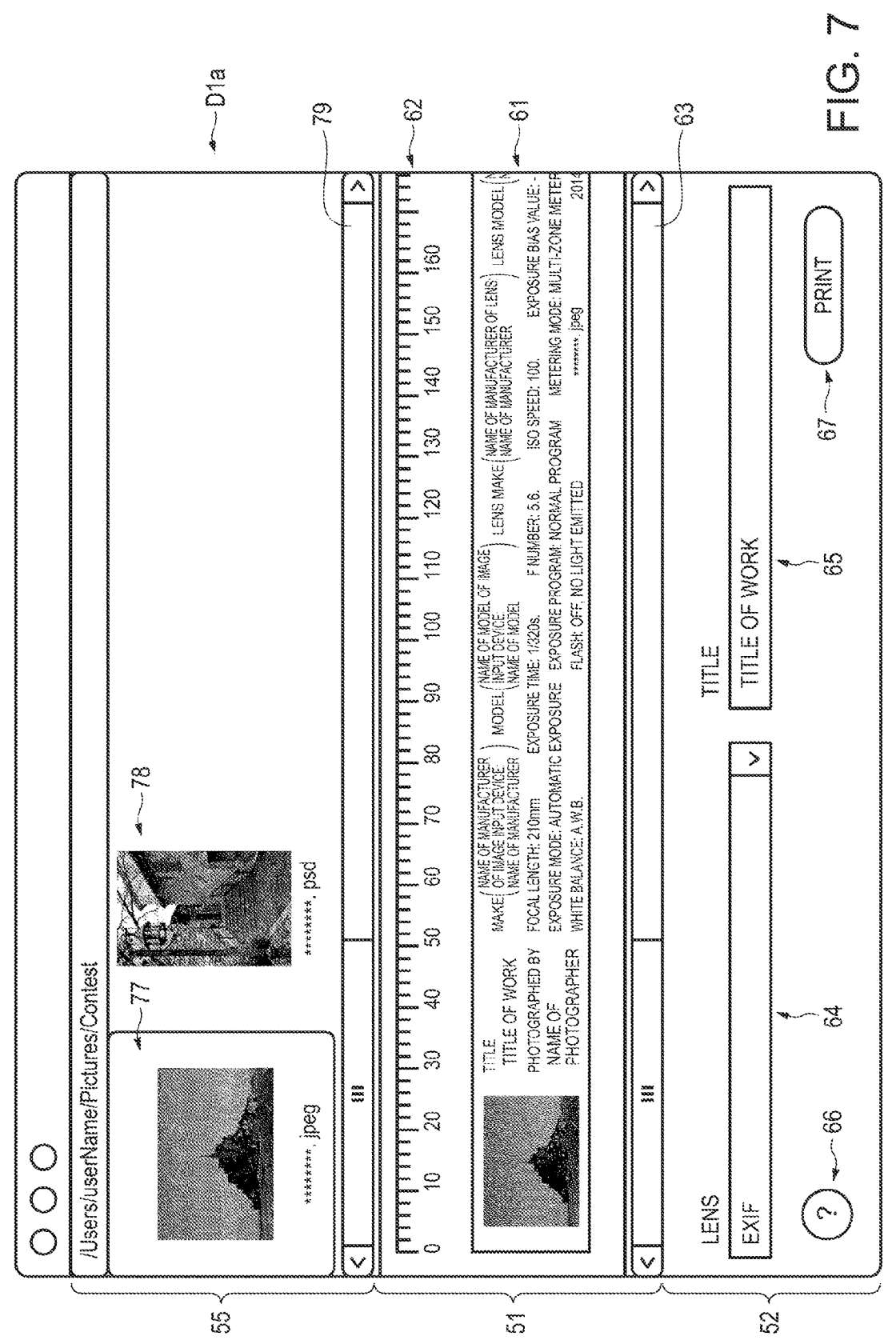

FIG. 7 shows an example of display on a first editing screen D1a according to Modification 1. The first editing screen D1a according to this example has the configuration of the first editing screen D1 according to the embodiment (see FIG. 4) with a work selection area 55 added thereto. In the work selection area 55, a list of a plurality of photographed images taken from an image input device and/or a memory is displayed. It is possible to select one of the photographed images and edit the photographed image, using the preview display area 51 and the input area 52. If a large number of photographed images are taken in, the display of the work selection area 55 can be scrolled by operating a scroll bar 79. In FIG. 7, the state where two photographed images 77, 78 are taken in and where, of these, the photographed image 77 is being edited, is shown. As the work selection area 55 is thus provided in the first editing screen D1, there is no need to open the first editing screen D1 for each photographed image, thus achieving high convenience.

Modification 2

Figure 8:
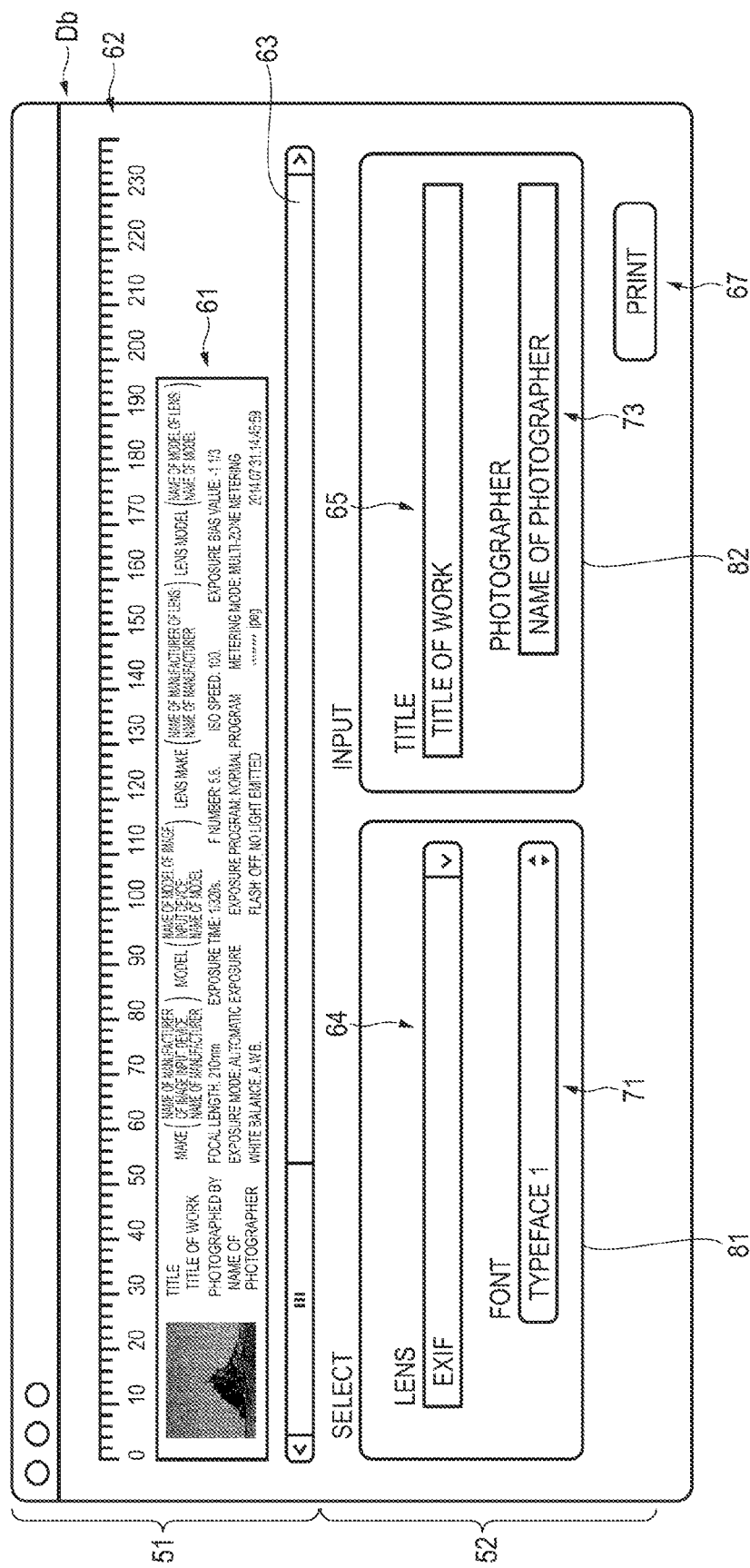
FIG. 8 shows an example of display on an editing screen according to Modification 2.

FIG. 8 shows an example of display on an editing screen Db according to Modification 2. The editing screen Db according to this example has a configuration in which parts of the first editing screen D1 (see FIG. 4) and the second editing screen D2 (see FIG. 5) are combined. For example, the input area 52 includes a selection area 81 and an input area 82. The selection area 81 includes the lens input section 64 and the typeface input section 71. The input area 82 includes the title input section 65 and the photographer input section 73. With such a simple editing screen Db, the user's time and effort for editing can be reduced. Also, it is also possible to allow the user to select whether to display the first editing screen D1 and the second editing screen D2 as described in the embodiment, or to display the editing screen Db according to Modification 2, on the basis of configuration settings or the like. Moreover, the first editing screen D1a according to Modification 1 may be added and made selectable by the user.

Modification 3

Figure 9:
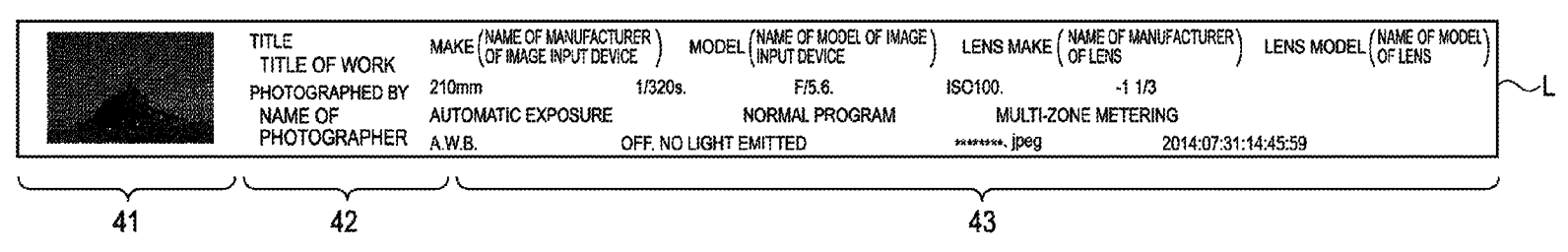

FIG. 9 is a plan view showing an example of the attachment label for work L according to Modification 3. Compared with the attachment label for work L according to the embodiment (see FIG. 3), the attachment label for work L according to this example has a configuration in which the item names (tag names) are deleted from the print area 43 for the text information. However, for items that are hard to grasp at first sight, a minimum additional description is provided, such as adding "F/" before the tag content "F-number" or adding "ISO" before the tag content "ISO speed". With such deletion of the item names, the print tape 31 can be saved. Also, it is possible to allow the user to select whether to add the item names or not, on the basis of configuration settings or the like.

Other Modifications

The print image generation unit 150 in the embodiment generates the reduced image printed in the print area 41 for the reduced image, by reducing the image data of the photographed image. However, the reduced image may be generated using the "thumbnail data" included in the image information. Also, the reduced image may be generated using the "thumbnail data" if the "thumbnail data" is included in the image information, and using the image data of the photographed image if the "thumbnail data" is not included in the image information.

In the embodiment, the attachment label for work L is printed on a separate print medium from the photographed image (work). However, the attachment label for work L may be printed on the same print medium as the photographed image. In this case, the editing screen D described in the embodiment and each modification may be incorporated in a part of the editing screen for editing the image data of the photographed image, and the printing of the photographed image and the print instruction on the attachment label for work L may be realized by a single press on the print execution button. Also, a configuration may be employed in which, while the attachment label for work L and the photographed image are printed on separate print media, the print instruction can be carried out by a single press on the print execution button. In this case, two printers may be connected to the PC 1. The image data of the photographed image may be outputted to a first printer and the print image of the attachment label for work L may be outputted to a second printer.

In the embodiment, the tape width of the print tape 31 is a fixed width. However, a plurality of kinds of tape widths may be made supportable. In this case, the print format of the attachment label for work L (the number of lines in the print area 42 for the input information and the print area 43 for the text information, and the like), font size, image size of the reduced image and the like may be varied according to the result of detection of the tape width by the tape printer 2.

Also, it is possible to enable input or selection of a size of the work, and vary the print format of the attachment label for work L, font size, image size of the reduced image and the like according to the size. In this case, it is preferable that the print image is edited in such a way that the tape length of the attachment label for work L becomes shorter than the length of the work in the lateral direction inputted by the user.

A proper tape width may be presented to the user according to the number of letters of the input information and the text information or the result of the selection in the item selection area 53, rather than editing the print image. For example, if the volume of information to be printed is large for the size of the work, abroad tape width may be recommended, whereas if the volume of information is small, a narrow tape width may be recommended.

A plurality of attachment labels for work L may be printed according to the number of letters of the input information and the text information or the result of the selection in the item selection area 53. That is, it is conceivable that if the volume of information is large, the print areas 41, 42 are printed as the first sheet and the print area 43 is printed as the second sheet, and the like.

On the editing screen D, information to be printed on the attachment label for work L (one or more of the reduced image, the input information and the text information) may be made selectable by the user. Also, the user may be allowed to designate the lengths and print order of the respective print areas 41, 42, 43. For each item selected in the item selection area 53, the user may be allowed to carry out text input using the keyboard 12, instead of using Exif.

In the embodiment, the items that are objects to be printed are selected, one by one in the item selection area 53. However, the selection may be made on the basis of the tag description correspondence level (essential, recommended, optional) prescribed by Exif. That is, if "essential" is selected, only an item on which the tag description correspondence level is defined as "essential" by Exif is printed.

While the print tape 31 is supplied using the tape cartridge C in the embodiment, it is also possible to supply the print tape 31 only (tape reel only). As the printing method thereof, other print methods than the thermal transfer method, such as an ink jet method, may be used.

While the print tape 31 is used as the print medium in the embodiment, printing may also be carried out on a strip-shaped label sheet such as die-cut paper. That is, a label printer may be used instead of the tape printer 2. In this case, since the label size is decided, it is preferable that the font size and linefeed width are varied according of letters of the input information and the text information. Also, the number of items that can be selected in the item selection area 53, or the number of letters that can be inputted as the input information may be limited, instead of editing the print image.

In the embodiment, the case where the image generation device according to the invention is applied to the PC 1 is described as an example. However, the image generation device may also be applied to various tablet terminals such as smartphone, or to mobile phones, PDAs (personal digital assistants) and the like. The image generation device according to the invention may also be incorporated as a part of an image input device.

While a photograph is employed as the photographed image (work), the invention may also be applied to video works. That is, a label to be attached to a recording medium (optical disk or the like) for recording a video work may be prepared.

Each component of the print system SY (PC 1) can be provided as a program. Also, the program can be stored in various recording media (CD-ROM, flash memory or the like) and provided in these forms. That is, a program for causing a computer to function as each component of the print system SY (PC 1) and a recording medium on which the program is recorded are included in the scope of the invention.

Also, the label print application described in the embodiment may be made to operate on a server connected to a user terminal via a network (cloud computing technology may be applied). While Exif information is given as an example of image information, other standards than Exif may also be employed. Moreover, changes can be made according to need without departing from the scope of the invention.

What is claimed is:

1. A print image generation device comprising:
   at least one processor configured to execute one or more programs to realize one or more functions of:
   a conversion unit which converts image information recorded with image data of a photographed image at the time of photographing the photographed image, into text information;
   an input unit which inputs input information including a title of the photographed image;
   a print image generation unit which generates a print image for printing the text information converted by the conversion unit and the input information inputted by the input unit, on a print medium for label; and
   a print instruction unit which gives a print instruction on the print image.

2. The print image generation device according to claim 1, wherein the print image generation unit generates a print image for printing, on the print medium, a reduced image formed by reducing the image data of the photographed image, with the text information and the input information.

3. The print image generation device according to claim 2, wherein the print image generation unit generates a print image in which the input information has a larger font size than the text information and in which a print area for the reduced image, a print area for the input information, and a print area for the text information are arranged laterally in this order.

4. The print image generation device according to claim 1, wherein the print medium for label is a tape-like medium, the device further comprises a preview display unit which shows a preview of the print image, and
the preview display unit displays an expected print appearance of the print image printed on the tape-like medium, and a scale indicating a length of the expected print appearance in a direction of tape length.

5. The print image generation device according to claim 1, wherein the input unit inputs a photographer and a name of a lens in addition to the title of the photographed image, as the input information.

6. The print image generation device according to claim 5, wherein the image information includes one of an artist, a copyright holder for photographing, and a copyright holder for editing, and
the input unit can select one of the artist, the copyright holder for photographing, and the copyright holder for editing included in the image information, instead of inputting the photographer, if the image information includes one of the artist, the copyright holder for photographing, and the copyright holder for editing.

7. The print image generation device according to claim 1, wherein the image information includes a plurality of items including an item related to equipment and an item related to exposure, the at least one processor is further configured to execute one or more programs to realize one or more functions of an item selection unit which selects one item from the plurality of items, and the conversion unit converts the item selected by the item selection unit, into the text information.

8. The print image generation device according to claim 1, wherein the image information includes a name of a model of an image input device with which the photographed image is photographed, and the print image generation unit generates the print image omitting a name of a manufacturer if the name of the manufacturer is included in the name of the model of the image input device included in the text information.

9. The print image generation device according to claim 1, wherein the image information includes a name of a model of a lens, and the print image generation unit generates the print image omitting a name of a manufacturer if the name of the manufacturer is included in the name of the model of the lens included in the text information.

10. The print image generation device according to claim 1, wherein the image information includes an F-number or a lens focal length, and the conversion unit converts the F-number or the lens focal length in a fractional notation into a decimal notation at the time of conversion to the text information.

11. The print image generation device according to claim 1, wherein the image information includes a duration of exposure, and the conversion unit converts the duration of exposure into a decimal notation if the duration of exposure is 1 second or longer, and into a proper fractional notation reduced to the lowest terms if the duration of exposure is shorter than 1 second, at the time of conversion to the text information.

12. The print image generation device according to claim 1, wherein the image information includes an exposure correction value, and the conversion unit converts the exposure correction value into a mixed number notation if an absolute value of the exposure correction value is 1 or greater, and into a proper fractional notation reduced to the lowest terms if the absolute value of the exposure correction value is less than 1, at the time of conversion to the text information.

13. A print system comprising:

a print image generation device; and a printer, the print image generation device including at least one processor configured to execute one or more programs to realize one or more functions of:

a conversion unit which converts image information recorded with image data of a photographed image at the time of photographing the photographed image, into text information, an input unit which inputs input information including a title of the photographed image, a print image generation unit which generates a print image for printing the text information converted by the conversion unit and the input information inputted by the input unit, on a print medium for label, and a print instruction unit which gives the printer a print instruction on the print image, the printer including a print unit which prints the print image on the print medium according to the print instruction by the print instruction unit.

14. A print image generation method comprising executing:

converting, by a print image generation device including at least one processor, image information recorded with image data of a photographed image at the time of photographing the photographed image, into text information;

inputting, by the print image generation device, input information including a title of the photographed image;

generating, by the print image generation device, a print image for printing the text information which is converted and the input information which is inputted, on a print medium for label; and giving, by the print image generation device, a print instruction on the print image.

15. A program comprising computer-executable instructions on at least one non-transitory computer-readable storage medium for causing a computer to execute each process in the print image generation method according to claim 14.

* * * * *